United States Patent
Williams

(10) Patent No.: US 9,246,796 B2
(45) Date of Patent: Jan. 26, 2016

(54) TRANSMITTING AND FORWARDING DATA

(75) Inventor: Matthew Williams, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 500 days.

(21) Appl. No.: 13/600,129

(22) Filed: Aug. 30, 2012

(65) Prior Publication Data

US 2013/0232277 A1 Sep. 5, 2013

(30) Foreign Application Priority Data

Aug. 31, 2011 (GB) .................................. 1115029.9

(51) Int. Cl.
*H04L 12/703* (2013.01)
*H04L 12/707* (2013.01)

(52) U.S. Cl.
CPC ................ *H04L 45/22* (2013.01); *H04L 45/28* (2013.01)

(58) Field of Classification Search
CPC ........ H04L 45/28; H04L 49/351; H04L 45/22
See application file for complete search history.

(56) References Cited

U.S. PATENT DOCUMENTS

| | | | |
|---|---|---|---|
| 5,959,972 A * | 9/1999 | Hamami | 370/228 |
| 6,272,580 B1 | 8/2001 | Stevens et al. | |
| 6,741,559 B1 | 5/2004 | Smeulders et al. | |
| 6,895,024 B1 * | 5/2005 | Drake et al. | 370/536 |
| 6,981,054 B1 | 12/2005 | Krishna | |
| 6,981,174 B1 * | 12/2005 | Hanning | 714/5.1 |
| 2003/0204587 A1 * | 10/2003 | Billhartz | 709/224 |
| 2005/0281204 A1 | 12/2005 | Karol et al. | |
| 2007/0076727 A1 * | 4/2007 | Shei | 370/401 |
| 2007/0237085 A1 * | 10/2007 | Tirumalai et al. | 370/242 |
| 2008/0028157 A1 * | 1/2008 | Steinmetz et al. | 711/149 |
| 2008/0117809 A1 | 5/2008 | Wang et al. | |
| 2009/0285198 A1 | 11/2009 | Schwartz et al. | |
| 2010/0002702 A1 | 1/2010 | Saito et al. | |
| 2010/0128667 A1 | 5/2010 | Russell | |
| 2010/0142368 A1 * | 6/2010 | Gunukula et al. | 370/217 |
| 2010/0259221 A1 * | 10/2010 | Tabatowski-Bush | 320/134 |
| 2011/0252144 A1 * | 10/2011 | Tung et al. | 709/227 |
| 2012/0120791 A1 * | 5/2012 | Ananda Ganesan et al. | 370/225 |

FOREIGN PATENT DOCUMENTS

EP 2243255 10/2010

OTHER PUBLICATIONS http://www.h3c.com/portal/Technical_Support_Documents/Technical_Documents/Switches/H3C_S3610[S5510]_Series_Switches/Configuration/Operation_Manual/H3C_S3610[S5510]_OM-Release_5309-6W100/07-System_Volume/200905/633329_1285_0.htm, H3C Technologies Co., Limited, Copyright 2003-2012.

* cited by examiner

*Primary Examiner* — Joe Chacko
(74) *Attorney, Agent, or Firm* — EIP US LLP

(57) ABSTRACT

A network comprises a communication device having network communication interfaces and a data processing node having network communication ports. The communication device includes a first and a second interface communicatively coupled to a first and a second port of the data processing node respectively. The first interface is selected as a primary interface for the transmission of network traffic to destinations across the network. The second interface is selected as a backup interface which is to be selected for the transmission of the network traffic in the case of a need to failover to the backup interface. Network traffic from the communication device is transmitted via the first interface while the first interface is selected as the primary interface. At least one data message is transmitted from the communication device via the second interface, while the first interface is selected as the primary interface.

21 Claims, 4 Drawing Sheets

TRANSMITTING AND FORWARDING DATA

CROSS REFERENCE TO RELATED APPLICATION

This application claims priority to foreign Patent Application No. GB 1115029.9, filed on Aug. 31, 2011, the content of which is hereby incorporated by reference herein in its entirety.

TECHNICAL FIELD

The present invention relates to methods of transmitting and forwarding data, computer program products for performing such methods, to a communication device for transmitting data, and to data processing node for forwarding data.

BACKGROUND

Computer networks interconnect network nodes so that the nodes can communicate with each other. In some cases, network nodes may be directly connected to each other. In other cases, network nodes may be connected via one or more intermediate network nodes.

As the size and complexity of the network grows, the number of possible communication paths between any two network nodes can also increase. In such cases, network traffic is not always necessarily communicated via a preferred communication path between the two network nodes. In some cases, network traffic can be routed via a relatively indirect communication path even when there is a relatively direct communication path between two network nodes.

In telephony networks, the sending of telephony traffic via a relatively indirect communication path including a remote switch when it could be sent more directly is sometimes referred to as "tromboning." Tromboning is generally undesirable, because it tends to use more bandwidth, which requires higher-capacity links and switching hardware and can lead to increased costs in setting up and running the network. It can also make the network less predictable and harder to specify and troubleshoot. In such cases, it would be preferable to be able to send the traffic via the preferred, relatively direct communication path.

It would be desirable to provide improved methods and apparatuses for transmitting and forwarding data in a network.

SUMMARY

In accordance with a first aspect of the invention, there is provided a method of transmitting data in a network, the network including a communication device having a plurality of network communication interfaces, and a data processing node having a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, wherein the communication device includes a first interface communicatively coupled to a first port of the data processing node and a second interface communicatively coupled to a second port of the data processing node, the method comprising:

selecting the first interface as a primary interface for the transmission of network traffic to destinations across the network, and the second interface as a backup interface which is to be selected for the transmission of the network traffic in the case of a need to failover to the backup interface;

while the first interface is selected as the primary interface, transmitting network traffic from the communication device via the first interface; and while the first interface is selected as the primary interface, transmitting at least one data message from the communication device via the second interface, in order to enable the selection by the data processing node of the second port as the preferred forwarding port for the communication device in the event of the network traffic being received at the first port of the data processing node.

According to a second aspect of the invention, there is provided a method of forwarding data in a network, the network including a communication device having a plurality of network communication interfaces, and a data processing node having a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, wherein the data processing node includes a first port communicatively coupled to a first interface of the communication device and a second port communicatively coupled to a second interface of the communication device, the method comprising:

receiving network traffic from the communication device via the first port;

receiving at least one data message from the communication device via the second port;

receiving network traffic destined for the communication device; and while receiving the network traffic from the communication device via the first port, maintaining selection of the second port as the preferred forwarding port for the network traffic destined for the communication device, on the basis of the data messages received via the second port.

According to a third aspect of the invention, there is provided a communication device for transmitting data in a network, the network including a data processing node having a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, wherein the communication device includes a first interface communicatively coupled to a first port of the data processing node and a second interface communicatively coupled to a second port of the data processing node, and wherein the communication device is arranged:

to select the first interface as a primary interface for the transmission of network traffic to destinations across the network, and the second interface as a backup interface which is to be selected for the transmission of the network traffic in the case of a need to failover to the backup interface;

while the first interface is selected as the primary interface, to transmit network traffic via the first interface; and while the first interface is selected as the primary interface, to transmit at least one data message via the second interface, in order to enable the selection by the data processing node of the second port as the preferred forwarding port for the communication device in the event of the network traffic being received at the first port of the data processing node.

According to a fourth aspect of the invention, there is provided a data processing node for forwarding data in a network, the network including a communication device having a plurality of network communication interfaces, wherein the data processing node has a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, and wherein the data processing node includes a first port which is arranged to be communicatively coupled to a first interface of the communication device and a second port which is arranged to be communicatively coupled to a second interface of the communication device, the data processing node being arranged:

to receive network traffic from the communication device via the first port;

to receive at least one data message from the communication device via the second port;

to receive network traffic destined for the communication device; and to maintain selection of the second port as the preferred forwarding port for the network traffic destined for the communication device, on the basis of the data messages received via the second port.

According to a fifth aspect of the invention, there is provided a computer program product comprising a non-transitory computer-readable storage medium having computer readable instructions stored thereon, the computer readable instructions being executable by a computerized device to cause the computerized device to perform a method for transmitting data in a network, the network including a communication device having a plurality of network communication interfaces, and a data processing node having a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, wherein the communication device includes a first interface communicatively coupled to a first port of the data processing node and a second interface communicatively coupled to a second port of the data processing node, the method comprising:

selecting the first interface as a primary interface for the transmission of network traffic to destinations across the network, and the second interface as a backup interface which is to be selected for the transmission of the network traffic in the case of a need to failover to the backup interface;

while the first interface is selected as the primary interface, transmitting network traffic from the communication device via the first interface; and while the first interface is selected as the primary interface, transmitting at least one data message from the communication device via the second interface, in order to enable the selection by the data processing node of the second port as the preferred forwarding port for the communication device in the event of the network traffic being received at the first port of the data processing node.

According to a sixth aspect of the invention, there is provided a computer program product comprising a non-transitory computer-readable storage medium having computer readable instructions stored thereon, the computer readable instructions being executable by a computerized device to cause the computerized device to perform a method of forwarding data in a network, the network including a communication device having a plurality of network communication interfaces, and a data processing node having a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, wherein the data processing node includes a first port communicatively coupled to a first interface of the communication device and a second port communicatively coupled to a second interface of the communication device, the method comprising:

receiving network traffic from the communication device via the first port;

receiving at least one data message from the communication device via the second port;

receiving network traffic destined for the communication device; and while receiving the network traffic from the communication device via the first port, maintaining selection of the second port as the preferred forwarding port for the network traffic destined for the communication device, on the basis of the data messages received via the second port.

Further features and advantages of the invention will become apparent from the following description of preferred embodiments of the invention, given by way of example only, which is made with reference to the accompanying drawings.

DETAILED DESCRIPTION

Figure 1:
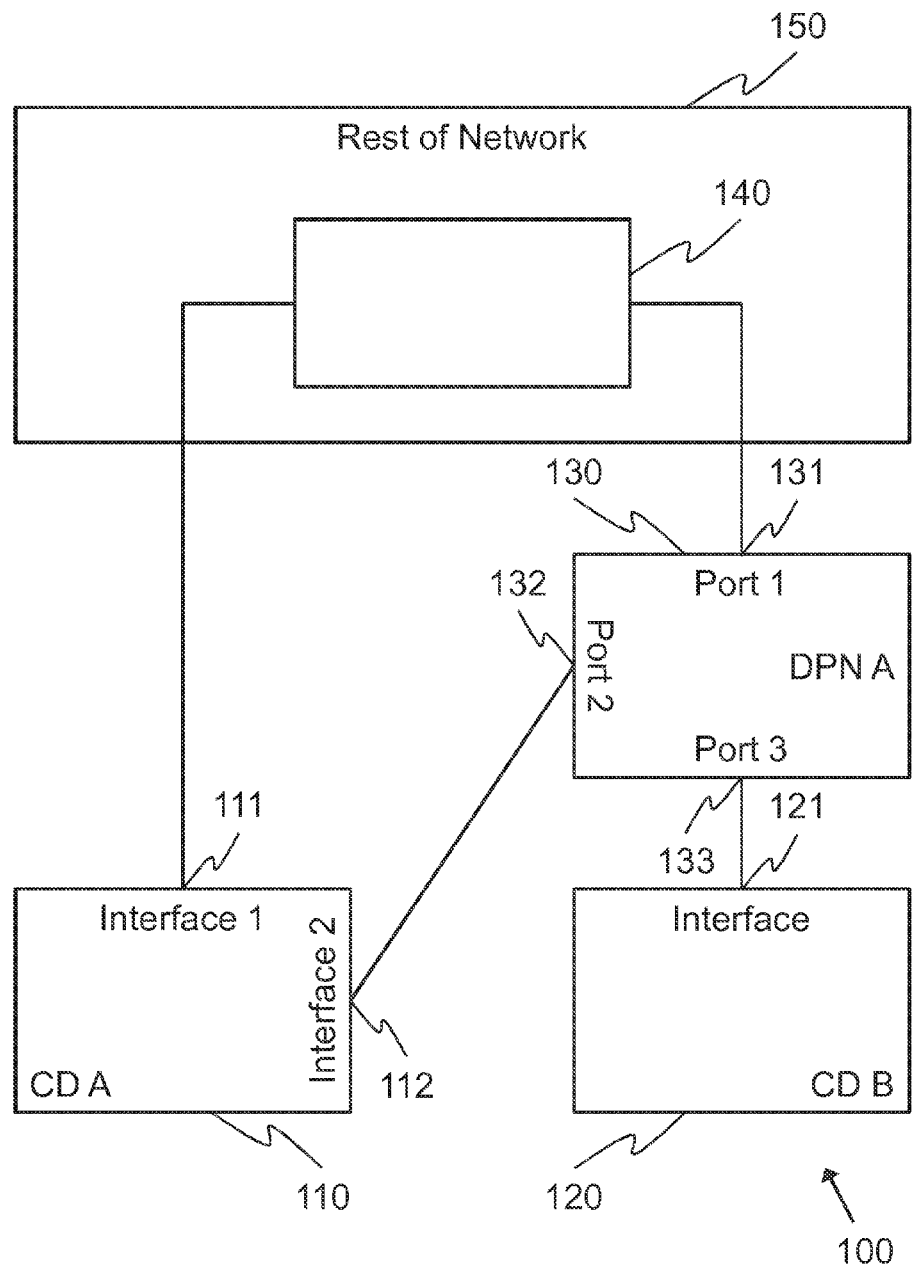
FIG. 1 shows a schematic block representation of a network according to some embodiments.

In a first embodiment of the invention, there is provided a method of transmitting data in a network, the network including a communication device having a plurality of network communication interfaces, and a data processing node having a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, wherein the communication device includes a first interface communicatively coupled to a first port of the data processing node and a second interface communicatively coupled to a second port of the data processing node, the method comprising:

selecting the first interface as a primary interface for the transmission of network traffic to destinations across the network, and the second interface as a backup interface which is to be selected for the transmission of the network traffic in the case of a need to failover to the backup interface;

while the first interface is selected as the primary interface, transmitting network traffic from the communication device via the first interface; and while the first interface is selected as the primary interface, transmitting at least one data message from the communication device via the second interface, in order to enable the selection by the data processing node of the second port as the preferred forwarding port for the communication device in the event of the network traffic being received at the first port of the data processing node.

Hence, data can be transmitted in a preferred manner in the network. In particular, the second port can be selected as a preferred forwarding port so that subsequent data destined for the communication device can be transmitted to the communication device via a preferred connection to the communication device. In some embodiments, the communication device may, therefore, receive subsequent data from the data processing node its second interface as the backup interface. In some embodiments, the communication device may be capable of receiving network traffic via the first and second interfaces so that there are various communication paths via which network traffic destined for the communication device can be transmitted to the communication device, from which a preferred communication path can be selected.

In some embodiments, the method comprises, while the first interface is selected as the primary interface, intermittently transmitting data messages from the communication device via the second interface. In such embodiments, the data processing node may use the intermittently transmitted data messages to maintain selection of the second port as the preferred forwarding port. This may be beneficial in situations in which the second port is periodically deselected as the preferred forwarding port.

In some embodiments, the method comprises setting a message destination identifier of the data messages to be the same as a message source identifier of the data messages, to allow the data processing node to recognise that the data messages are intended for processing only by the data processing node. Such embodiments enable the data processing node to determine how to handle the data messages.

In some embodiments, the method comprises setting a message destination identifier of the data messages to be an identifier reserved for data messages that are for processing only by the data processing node, to allow the data processing node to recognise that the data messages are intended for processing only by the data processing node. Such embodiments enable the data processing node to determine how to handle the data messages.

In some embodiments, the data processing node is arranged to deselect the second port as the preferred forwarding port for the communication device if no data is received from the communication device via the second port for a period of time, and the method comprises intermittently transmitting the data messages at time intervals which are less than the period of time. Such embodiments facilitate continued selection of the second port as the preferred forwarding port in systems where the selection of a given port as the preferred forwarding port expires periodically so that subsequent data can be transmitted to the communication device via the preferred forwarding port.

In some embodiments, the method comprises comparing at least one connectivity condition associated with the coupling between the first interface and the first port of the data processing node and at least one connectivity condition associated with the coupling between the second interface and the second port of the data processing node and selecting the first interface as the primary interface for the transmission of network traffic to destinations across the network on the basis of the comparison. Such embodiments provide for transmission of network traffic to destinations across the network via a preferred interface of the communication device based on connectivity in the network. By selecting the preferred interface in this way, data may be transmitted via an optimal communication path in the network.

In some embodiments, the first interface of the communication device is indirectly coupled to the first port of the data processing node via at least one intermediate network node and the second interface of the communication device is directly coupled to the second port of the data processing node. Such embodiments provide for relatively direct transmission of data from the data processing node to the communication device. In some cases, this can be used to avoid tromboning.

In some embodiments, at least some of the data messages comprise Address Resolution Protocol (ARP) messages, Neighbor Discovery Protocol (NDP) messages and/or Internet Control Message Protocol (ICMP) ping messages. Such embodiments provide messages of a type that have a relatively low processing overhead and are typically handled with a relatively high priority within the network.

In a second embodiment of the invention, there is provided a method of forwarding data in a network, the network including a communication device having a plurality of network communication interfaces, and a data processing node having a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, wherein the data processing node includes a first port communicatively coupled to a first interface of the communication device and a second port communicatively coupled to a second interface of the communication device, the method comprising:

receiving network traffic from the communication device via the first port;

receiving at least one data message from the communication device via the second port;

receiving network traffic destined for the communication device; and while receiving the network traffic from the communication device via the first port, maintaining selection of the second port as the preferred forwarding port for the network traffic destined for the communication device, on the basis of the data messages received via the second port.

Hence, data can be transmitted in a preferred manner in the network. In some embodiments, the data processing node may receive network traffic for the communication device and transmit the network traffic to the communication device via the second port. In some embodiments, the network comprises a Local Area Network (LAN) and the data processing node comprises a switch.

In some embodiments, the method comprises intermittently receiving data messages from the communication device via the second port. In such embodiments, the data processing node may use the intermittently transmitted data messages to maintain selection of the second port as the preferred forwarding port. This may be beneficial in situations in which the second port is periodically deselected as the preferred forwarding port.

In some embodiments, the first port has a first preference rank and the second port has a second preference rank, and the method comprises determining that the second port should be selected as the preferred forwarding port on the basis of comparing the first and second preference ranks. Such embodiments provide a basis on which to select the second port as the preferred forwarding port so that data can be transmitted in a preferred manner in the network. In some embodiments, the data processing node may assign the preference ranks prior to receiving the data messages via the second port. In other embodiments, the data processing node may assign the preference ranks in response to receiving the data messages via the second port.

In some embodiments, the data processing node is arranged to deselect the second port as the preferred forwarding port for the communication device, if no data is received from the communication device via the second port for a period of time. Such embodiments enable the data processing node to free up memory that is used to store the selection of the second port as the forwarding port. In some embodiments, the data processing node may store the selection of the second port as the preferred forwarding port for the communication device in a forwarding database.

In some embodiments, the method comprises intermittently receiving the data messages at time intervals which are less than the period of time. Such embodiments facilitate continued selection of the second port as the preferred forwarding port in systems where the selection of a given port as the preferred forwarding port expires periodically so that subsequent data can be transmitted to the communication device via the preferred forwarding port.

In some embodiments, the method comprises deselecting the second port as the preferred forwarding port for the communication device in response to detecting the occurrence of a fault in relation to the coupling between the second port and the second interface of the communication device. Such embodiments are responsive to events in the network that affect the preferred transmission of traffic in the network.

In some embodiments, the method comprises recognising that the data messages are intended for processing only by the data processing node and discarding the data messages without forwarding to other network nodes following the selection of the second port as the preferred forwarding port. While the communication device selects the first interface as the primary interface for transmitting network traffic to destinations across the network, some nodes in the network learn the location of the communication device based on the port via which they receive the network traffic from the communication device. In the event that such nodes also received the data messages, which are sent from the second interface of the communication device as the backup interface, they would associate the communication device with the port via which they received the data messages. Such nodes would then transmit any subsequent data destined for the communication device from the port via which they received the data messages, whereas it may be desirable for such nodes to transmit data destined for the communication device from the port via which they receive the network traffic, to the first interface of the communication device as the primary interface. These embodiments enable the data processing node to determine that the data messages should not reach such other nodes so that the network is able to transmit traffic destined for the communication device in the preferred manner.

In some embodiments, the method comprises recognising that a message destination identifier in the data messages is the same as a message source identifier in the data messages. Such embodiments enable the data processing node to determine how to handle the data messages.

In some embodiments, the method comprises recognising that a message destination identifier in the data messages is reserved for data messages for processing only by the data processing node. Such embodiments enable the data processing node to determine how to handle the data messages.

In a third embodiment of the invention, there is provided a communication device for transmitting data in a network, the network including a data processing node having a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, wherein the communication device includes a first interface communicatively coupled to a first port of the data processing node and a second interface communicatively coupled to a second port of the data processing node, and wherein the communication device is arranged:

to select the first interface as a primary interface for the transmission of network traffic to destinations across the network, and the second interface as a backup interface which is to be selected for the transmission of the network traffic in the case of a need to failover to the backup interface;

while the first interface is selected as the primary interface, to transmit network traffic via the first interface; and while the first interface is selected as the primary interface, to transmit at least one data message via the second interface, in order to enable the selection by the data processing node of the second port as the preferred forwarding port for the communication device in the event of the network traffic being received at the first port of the data processing node.

In a fourth embodiment of the invention, there is provided a data processing node for forwarding data in a network, the network including a communication device having a plurality of network communication interfaces, wherein the data processing node has a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, and wherein the data processing node includes a first port which is arranged to be communicatively coupled to a first interface of the communication device and a second port which is arranged to be communicatively coupled to a second interface of the communication device, the data processing node being arranged:

to receive network traffic from the communication device via the first port;

to receive at least one data message from the communication device via the second port;

to receive network traffic destined for the communication device; and to maintain selection of the second port as the preferred forwarding port for the network traffic destined for the communication device, on the basis of the data messages received via the second port.

In a fifth embodiment of the invention, there is provided a computer program product comprising a non-transitory computer-readable storage medium having computer readable instructions stored thereon, the computer readable instructions being executable by a computerized device to cause the computerized device to perform a method for transmitting data in a network, the network including a communication device having a plurality of network communication interfaces, and a data processing node having a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, wherein the communication device includes a first interface communicatively coupled to a first port of the data processing node and a second interface communicatively coupled to a second port of the data processing node, the method comprising:

selecting the first interface as a primary interface for the transmission of network traffic to destinations across the network, and the second interface as a backup interface which is to be selected for the transmission of the network traffic in the case of a need to failover to the backup interface;

while the first interface is selected as the primary interface, transmitting network traffic from the communication device via the first interface; and while the first interface is selected as the primary interface, transmitting at least one data message from the communication device via the second interface, in order to enable the selection by the data processing node of the second port as the preferred forwarding port for the communication device in the event of the network traffic being received at the first port of the data processing node.

In a sixth embodiment of the invention, there is provided a computer program product comprising a non-transitory computer-readable storage medium having computer readable instructions stored thereon, the computer readable instructions being executable by a computerized device to cause the computerized device to perform a method of forwarding data in a network, the network including a communication device having a plurality of network communication interfaces, and a data processing node having a plurality of network communication ports, the data processing node being arranged to select a forwarding port on which to forward data destined for a given communication device, the forwarding port being selected on the basis of a port on which it receives data from the given communication device, the data processing node being arranged to select a preferred forwarding port in the case of receipt of data from the given communication device on more than one of the plurality of ports, wherein the data processing node includes a first port communicatively coupled to a first interface of the communication device and a second port communicatively coupled to a second interface of the communication device, the method comprising:

receiving network traffic from the communication device via the first port;

receiving at least one data message from the communication device via the second port;

receiving network traffic destined for the communication device; and while receiving the network traffic from the communication device via the first port, maintaining selection of the second port as the preferred forwarding port for the network traffic destined for the communication device, on the basis of the data messages received via the second port.

FIG. 1 shows a network 100 according to some embodiments.

The network 100 includes two communication devices 110, 120, labelled in FIG. 1 and referred to herein as communication devices A and B. In some embodiments, communication devices A and B are network host devices that offer resources and services to other nodes in the network 100. In some embodiments, a communication device comprises at least one processor and at least one memory including computer program code. The at least one memory and the computer program code are configured to, with the at least one processor, cause the communication device at least to perform a method for transmitting data in a network.

Communication device A has a plurality of network connection interfaces—including a first interface 111 and a second interface 112—that allow it to communicate with other nodes in the network 100. Communication device B includes a network communication interface 121 that allows it to communicate with other nodes in the network 100.

The interfaces 111, 112, 121 are associated with equipment identifiers that uniquely identify the interfaces 111, 112, 121 within the network 100 for addressing purposes. In some embodiments, the network 100 comprises a Local Area Network (LAN). In such embodiments, the equipment identifier is a Media Access Control (MAC) address. A MAC address may be assigned by the manufacturer of the interface 111, 112, 121 during manufacture and, in such cases, is sometimes referred to as a 'burned-in' MAC address. However, other per-interface MAC addresses could be used instead of burned-in MAC addresses.

In some embodiments, communication device A is assigned a single MAC address that is shared between both of its interfaces 111, 112. In such embodiments, messages transmitted from communication device A are transmitted from the same, shared MAC address regardless of whether the message is transmitted from the first or second interface 111, 112. In some embodiments, the single MAC address is different from both of the burned-in MAC addresses associated with the first and second interfaces 111, 112. This allows traffic to be sent from either of the interfaces 111, 112 and to be received via either of the interfaces 111, 112 by virtue of their shared association with the single MAC address.

However, in certain cases, messages are sent from the burned-in MAC address associated with the interface 111, 112 from which the message is sent so that any responses to the message can be sent back to the same interface 111, 112 from which the message was originally sent. Examples of such messages include, but are not limited to being, Internet Control Message Protocol (ICMP) ping messages, Address Resolution Protocol (ARP) messages or Neighbor Discovery Protocol (NDP), which can be used to probe links in the network 100 for faults. In such cases, responses to such probing messages should be sent back to the same interface 111, 112 from which they were transmitted so that the connectivity associated with each interface 111, 112 can be assessed on the basis of any responses to the probing messages.

The network 100 also includes a data processing node 130, labelled in FIG. 1 and referred to herein as data processing node A. In some embodiments, data processing node A is a switch having first, second and third network communication ports 131, 132, 133 that allow it to communicate with other nodes in the network 100. In some embodiments, a data processing node comprises at least one processor and at least one memory including computer program code. The at least one memory and the computer program code are configured to, with the at least one processor, cause the data processing node at least to perform a method for forwarding data in a network.

The first interface 111 of communication device A is indirectly communicatively coupled to the first port 131 of data processing node A via at least one other node 140 in the rest of the network 150. In some embodiments, the at least one other node 140 comprises a switch, a router or the like. Although only one node 140 is shown in the rest of the network 150 in FIG. 1, in reality, many nodes are likely to be located in the rest of the network 150.

The second interface 112 of communication device A is directly communicatively coupled to the second port 132 of data processing node A. The first interface 121 of communication device B is directly communicatively coupled to the third port 133 of data processing node A.

There are various ways by means of which the various network nodes 110, 120, 130, 140 can be communicatively coupled to each other. In some embodiments, at least some of the communicatively couplings are provided by a physical link, such as an Ethernet cable. In some embodiments, at least some of the couplings are provided by means of wireless connections, such as wireless connections in accordance with the Institute of Electrical and Electronics Engineers IEEE 802.11 standard.

In use, communication device A selects its first interface 111 as a primary interface for the transmission of network traffic to destinations across the network 100. Communication device A also selects its second interface 112 as a backup interface which is to be selected for the transmission of the network traffic in the case of a need to failover to the backup interface, for example if a fault occurs in relation to the first interface 111 or if a node or connection segment in the communication path between the first interface 111 and the first port 131 of data processing node A fails. Such network traffic may be, but is not limited to being, media data (such as voice, video or image data), data files, signalling data (such as is used to set up media sessions) and the like.

In some embodiments, communication device A compares at least one connectivity condition associated with the first interface 111 with at least one connectivity condition associated with the second interface 112 and selects the first interface 111 as the primary interface on the basis of the comparison. The connectivity condition may include, but is not limited to being, signal quality or presence associated with the first and second interfaces 111, 112, the available bandwidth associated with the first and second interfaces 111, 112, the reliability of ICMP ping messages, ARP messages or NDP messages associated with the first and second interfaces 111, 112 and/or an administrative preference. The primary interface may be selected by means of an interface selection algorithm that determines which interface should be selected as the primary interface, based on one or more of the connectivity conditions.

In some embodiments, communication device A is capable of receiving network traffic via the first and second interfaces 111, 112, even though it transmits network traffic to destinations across the network 100 via the first interface 111 as the primary interface. However, since communication device A transmits network traffic via the primary interface, other nodes in the network 100 can learn the location of communication device A as a result of receiving the network traffic transmitted via the primary interface. Accordingly, such other nodes are likely to forward network traffic to communication device A along the same path via which they received the network traffic from communication device A. As such, communication device A generally receives data from such other nodes via the first interface 111 as the primary interface.

In use, data processing node A is arranged to select one of its ports 131, 132, 133 as a forwarding port on which to forward data destined for a given communication device. The selection is on the basis of a port on which it receives data from the given communication device. When data processing node A receives data from the given communication device, it updates or creates a new entry in a forwarding database that it maintains which associates the given communication device with the port on which data processing node A received the data from the given communication device, for example by associating the MAC address of the given communication device with the Port ID of the port via which it received the data. If data processing node A receives subsequent data for the given communication device, it can consult the forwarding database, select the forwarding port for the given communication device, via which it previously received the data from the given communication device, and then may transmit the data to the given communication device via the forwarding port.

In some cases, data processing node A receives network traffic transmitted from the primary interface of communication device A at its first port 131. This can happen, for example, if communication device A transmits network traffic destined for communication device B, which is routed via the at least one other network node 140 in the rest of the network 150 and arrives at the first port 131 of data processing node A from the rest of the network 150.

In such cases, data processing node A ordinarily updates its forwarding database to associate communication device A with its first port 131 since the forwarding port is selected on the basis of a port on which data processing node A receives data from communication device A. In such cases, data processing device A would forward any subsequent data for communication device A, for example that it receives from communication device B, via its first port 131, through the rest of the network 150, to the first interface 111 of communication device A. In such cases, the subsequent traffic would be sent to communication device A via the relatively indirect coupling, rather than the relatively direct coupling between data processing node A and communication device A. As explained above, such tromboning of traffic via the relatively indirect coupling is generally undesirable.

To address this, data processing node A is arranged to select a preferred forwarding port in the case of receipt of data from communication device A on more than one of the plurality of ports 131, 132, 133. In the network 100 shown in FIG. 1 and described above, it may be preferable for data destined for communication device A to be transmitted to communication device A via the relatively direct coupling instead of the relatively indirect coupling.

While communication device A selects the first interface 111 as the primary interface, communication device A also intermittently transmits data messages via the second interface 112. Data processing node A receives the data messages intermittently via the second port 132. The data messages allow data processing node A to select the second port 132 as the preferred forwarding port for communication device A in the event that data processing node A receives network traffic at its first port 131. If data processing node A did not receive such data messages via the second port 132, it may be unaware that the relatively direct coupling between communication device A and data processing node A is available and may, otherwise, only send data destined for communication device A via its first port 131 and the at least one node 140 in the rest of the network 150. In embodiments where the coupling between the second interface 112 of communication device A and the second port 132 of data processing node A is relatively direct compared to the relatively indirect coupling between the first interface 111 of communication device A and the first port 131 of data processing node A, the selection of the second port 132 as the preferred port provides a relatively direct connection to communication device A.

As explained above, the data messages enable data processing node A to select the second port 132 as the preferred forwarding port in the event that data processing node A receives the network traffic transmitted from the primary interface of communication device A at its first port 131. Since the data messages are transmitted from communication device A via the second interface 112 as the backup interface, other nodes that learn the location of communication device A based on the port via which they receive data from communication device A, would update their forwarding tables to associate communication device A with the port via which they receive the data messages. However, it is desirable that such other nodes associate communication device A with one of their ports that provides a connection to the first interface 111 as the primary interface of communication device A. Accordingly, the data messages are intended only for use by data processing node A and should not be forwarded by data processing node A to other nodes in the network 100, so as not to confuse such other nodes as to the correct location of communication device A.

In order to address this, in some embodiments, communication device A sets a message destination identifier of the data messages that it transmits intermittently via the second interface 112 as the backup interface to be the same as a message source identifier of the data messages. For example, communication device A may set the destination identifier to be the shared MAC address, even though it is transmitting those messages to data processing node A and not to itself, so that data processing node A can recognise that the data messages should not be forwarded to other nodes in the network 100. In some embodiments, communication device A may set the destination identifier to be a predetermined identifier that is reserved for data messages for processing only by the data processing node. In some embodiments, the predetermined identifier is chosen to be an identifier that is not associated with any nodes in the network 100 and is sometimes referred to as a 'black hole' identifier. In some embodiments, data processing node A may include a control processor that has its own MAC address. In such embodiments, communication device A may set the message destination identifier of the data messages that it transmits intermittently via the second interface 112 as the backup interface to be the MAC address associated with the control processor of data processing node A.

Setting the message destination identifier in this way allows data processing node A to recognise that the data messages are for processing only by itself and should not be forwarded to other nodes in the network 100. As such, data processing node A may discard the data messages without forwarding them to other network nodes following the selection of the second port 132 as the preferred forwarding port. In some embodiments, at least some of the data messages may be ARP messages, NDP messages and/or ICMP ping messages. However, any other valid data messages in the network 100 could be used.

In some embodiments, the first port 131 has a first preference rank and the second port 132 has a second preference rank. Data processing node A may then determine that the second port 132 should be selected as the preferred forwarding port on the basis of comparing the first and second preference ranks. The preference ranks may be static or may be dynamic, for example to reflect changes in connectivity conditions in the network 100.

In some embodiments, data processing node A may store the selection of the second port 132 as the preferred forwarding port for communication device A in its forwarding database. In some embodiments, data processing node A may be arranged to deselect the second port 132 as the preferred forwarding port for communication device A if no data is received from communication device A via the second port for a period of time, for example by deleting the association between communication device A and the preferred forwarding port in the forwarding database. Thus, the association between the second port 132 and communication device A remains valid for a time period and is removed at the expiry of that time period. This process may be used to keep the forwarding database up to date in relation to the current connectivity in the network 110. As such, unused couplings can be removed from the forwarding databases so that new entries can be added and so that historic entries do not occupy unnecessary space in the forwarding database. In some cases, an entry in a forwarding database may be valid for, for example, thirty seconds before it expires and is removed from the forwarding database.

In some embodiments, data communication device A may transmit, and data processing node A may receive, the data messages at time intervals which are less than the period of time after which data processing node is arranged to deselect the second port as the preferred forwarding port for communication device A.

In some embodiments, the deselecting of the second port 132 as the preferred forwarding port for communication device A may be in response to detecting the occurrence of a fault in relation to the coupling between the second port 132 and the second interface 112 of communication device A. In such cases, the second port 132 may no longer be the preferred forwarding port for communication device A and another port can be selected as the preferred forwarding port. The deselecting may be accelerated compared to the abovementioned periodic deselection of the second port 132 as the preferred forwarding port. In such cases, the forwarding database can be cleared of an association between communication device A and the second port 132 as soon as possible after the detection of the fault so that data is not transmitted to communication device A via the second port 132 which is associated with the fault.

In some embodiments, data processing node A receives network traffic for communication device A, for example from communication device B, and transmits the network traffic communication device A via the second port 132. As explained above, the network traffic may be various types of data messages including, but not limited to being, media data messages, data file messages, signalling information messages or the like.

Figure 2:
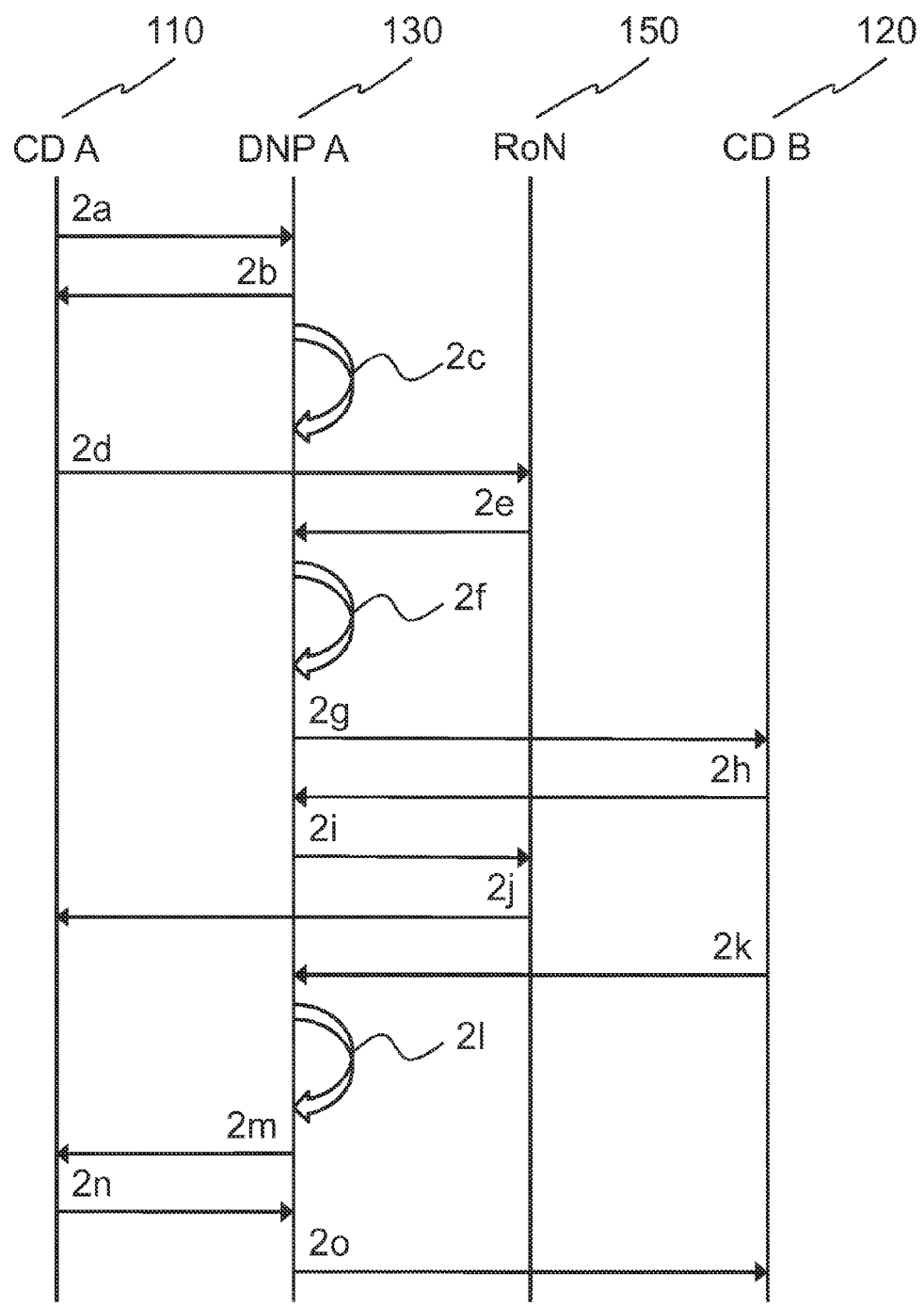
FIG. 2 shows a method of transmitting data according to some embodiments.

FIG. 2 is a sequence diagram showing a method of transmitting data according to some embodiments. The process may be implemented in a network 100 such as that shown schematically in FIG. 1.

Prior to processing, communication devices A and B, data processing node A and the at least one other network node 140 in the rest of the network 150 are powered up and the various couplings between them are established. At this stage, data processing node A is not aware of the location of communication device A. As such, if data processing node A were to receive network traffic for communication device A, it would broadcast the network traffic on all of its ports 131, 132, 133 (other than the one on which it received the network traffic) in line with standard Destination Lookup Failure (DLF) processing.

Processing begins at step 2a, when communication device A intermittently transmits data messages to the second port 132 of data processing node A via its second interface 112 as the backup interface. Data processing node A may respond to the data messages at step 2b, for example if the data messages are ARP, NDP or ICMP ping messages. At step 2c, data processing node A creates a new entry in its forwarding database that associates communication device A with the second port 132, via which it received the data messages. Data processing node A recognises that the messages are intended for processing only by itself and, after updating its forwarding database, discards the data messages and does not forward them to other nodes in the network 100. Data processing node A can refer to the forwarding database in the event that it receives subsequent data for communication device A to determine the port that it should select as the preferred forwarding port for transmitting the subsequent data to communication device A. Communication device A continues to send the data messages intermittently (not shown) from the second interface 112 as the backup interface to the second port 132 of data processing node A in order to enable data processing node A to select the second port 132 as the preferred forwarding port for communication device A in the event that data processing node A receives network traffic transmitted from the first interface 111 as the primary interface of communication device A via its first port 131.

At step 2d, communication device A transmits network traffic destined for communication device B via its first interface 111 as the primary interface. Data processing node A receives the network traffic from the rest of the network via its first port 131 at step 2e. At step 2f, data processing node A determines that the second port 132 should be selected as the preferred forwarding port, for example on the basis of comparing a first preference rank associated with the first port 131 and a second preference rank associated with the second port 132. At steps 2g and 2h, data processing node A transmits the network traffic to communication device B via its third port 133 and receives an acknowledgement message from communication device B via its third port 133. At steps 2i and 2j, data processing node A may acknowledge receipt of the network traffic by communication device B to communication device A via the at least one node 140 in the rest of the network 150. In some embodiments, data processing node A may acknowledge receipt of the network traffic by communication device B to communication device A via the relatively direct coupling associated with the second port 132 of data processing node A and the second interface 112 as the backup interface of communication device A.

At step 2k, data processing node A receives data from communication device B that is destined for communication device A. At step 2l, data processing node A identifies the entry in its forwarding database that associates communication device A with the second port 132 and data processing node A selects the second port 132 as the preferred forwarding port. At step 2m, data processing node A transmits the subsequent data to communication device A via its second port 132 as the preferred forwarding port and may receive an appropriate acknowledgement message from communication device A at step 2n. Data processing node A may then transmit an appropriate acknowledgement message to communication device B at step 2o.

Figure 3:
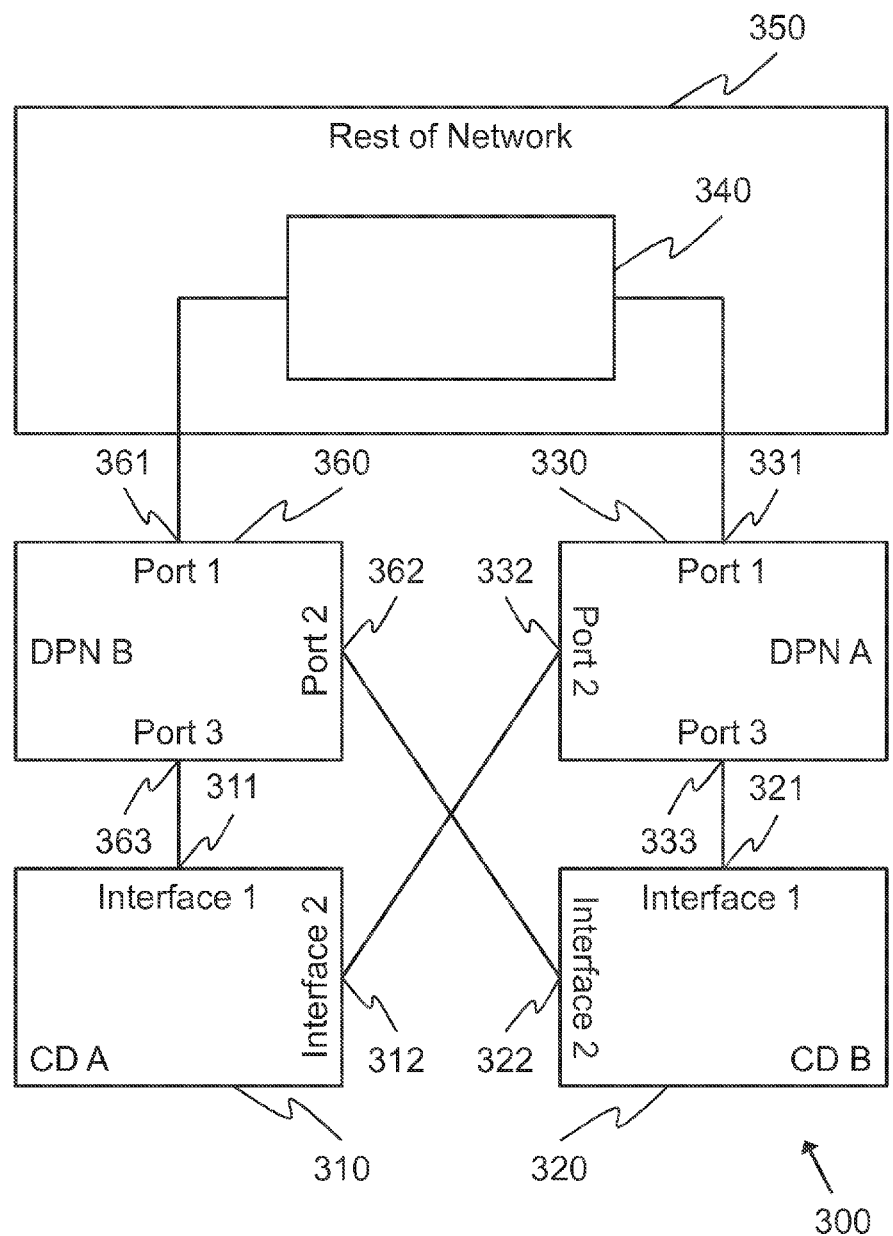
FIG. 3 shows a schematic block representation of a network according to some embodiments.

FIG. 3 shows a network 300 according to some embodiments. The network 300 shown in FIG. 3 is similar to the network 100 shown in FIG. 1. As such, like features are indicated using like reference numerals, but are incremented by 200. In particular, the network 300 includes communication devices 310, 320 (referred to, again, herein and in FIG. 3 as communication device A and communication device B respectively), at least one node 340 in the rest of the network 350 and data processing node 330 (referred to, again, herein and in FIG. 3 as data processing node A).

However, the network 300 also includes a second data processing node 360, labelled in FIG. 3 and referred to herein as data processing node B.

Furthermore, although communication device B in the network 300 shown in FIG. 3 is similar to communication device B shown in FIG. 1, communication device B in the network 300 shown in FIG. 3 includes a second interface 322 by means of which it can communicate with data processing node B.

In the network 300 shown in FIG. 3, the first interface 311 of communication device A is directly connected to the third port 363 of data processing node B. Similarly, the first interface 321 of communication device B is directly connected to the third port 333 of data processing node A. The second interface 312 of communication device A is directly connected to the second port 332 of data processing node A. Similarly, the second interface 322 of communication device B is directly connected to the second port 362 of data processing node A. The first port 331 of data processing node A is indirectly connected to the first port 361 of data processing node B via the at least one node 340 in the rest of the network 350. The first interface 311 of communication device A is, therefore, indirectly coupled to the first port 331 of data processing node A via data processing node B and the at least one node 340 in the rest of the network 350. Similarly, the first interface 321 of communication device B is indirectly connected to the first port 361 of data processing node B via data processing node A and the at least one node 340 in the rest of the network 350.

This network topology may be used to provide fault-tolerance in the event of a failure associated with communication device A or B, data processing node A or B or any of the links between them. The rest of the network 350 may also be fault-tolerance so as to be able to cope with failures associated with the at least one node 340 in the rest of the network 350. In the fault-tolerant network topology shown in FIG. 3, communication devices A and B can send and receive traffic to and from the rest of the network 350 via either data processing node A or B by selecting their first interface 311, 321 or their second interface 312, 322 as the primary interface for the transmission of network traffic to destinations across the network 300. In some cases, one of the communication devices 310, 320 may select their first interface 311, 321 as the primary interface and the other of the communication devices 310, 320 may select their second interface 312, 322 as the primary interface. If traffic cannot flow via, for example, data processing node A, communication device A and B may be able to detect this, for example by sending ARP, NDP or ICMP ping probing requests and checking for responses via their second interface 312 and first interface 321 respectively. In such cases, communication device A may continue to select its first interface 311 as its primary interface, while communication device B may select its second interface 322 as its primary interface so that it can send network traffic to destinations across the network 300 via data processing node B.

In some embodiments, data processing nodes A and B are not directly connected to each other to avoid creating a loop in which broadcast traffic could cycle. However, in other embodiments, data processing nodes A and B may be directly connected to each other. In such other cases the network 300 may use the Spanning Tree Protocol (STP) to avoid creating such a loop and the direct connection between data processing nodes A and B can be used when required. However, it can take a reasonable amount of time to establish the direct connection between nodes A and B—at least thirty seconds in some cases—which may not be sufficient where fast recovery following link or node failure is required.

Because of the topology of the network 300 shown in FIG. 3, ordinarily, and as explained above, when network traffic can flow via both data processing node A and data processing node B, communication devices A and B may each transmit network traffic for destinations across the network 300 via a different one of the data processing nodes. In such situations, traffic from communication device A destined for communication device B may traverse the rest of the network to reach communication device B. This is because, ordinarily, the data processing nodes A and B send data destined for a given communication device from the port via which they last received data from the given communication device, the association between the given communication device and the port via which it last received data from the given communication device being recorded in the forwarding database of the data processing node A or B. Thus, if communication device B sends all its network traffic for destinations across the network 300 via data processing node A, the only port via which data processing node B would have received data from communication device B is its first port 361 which connects it to the rest of the network 350. Data processing node B would, therefore, send all subsequent data destined for communication device B via its first port 360 and via the relatively indirect coupling through the rest of the network 350.

However, as explained above, by intermittently transmitting the data messages via the second interfaces 312, 322 as backup interfaces, communication devices A and B can enable data processing nodes A and B respectively to select their second ports 332, 362 as the preferred forwarding port for communication device A and B respectively in the event of data processing nodes A and B respectively receiving network traffic transmitted from communication devices A and B respectively via their first ports 331, 361.

Figure 4:
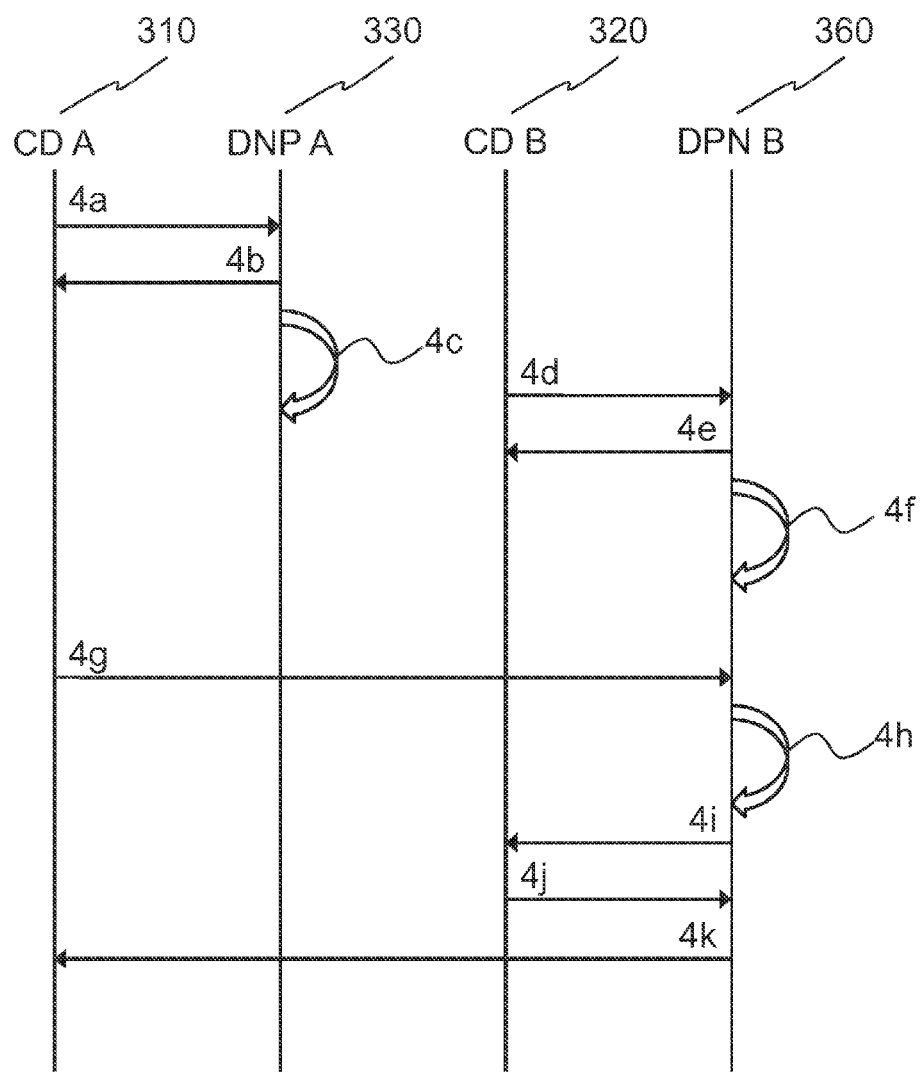
FIG. 4 shows a method of transmitting data according to some embodiments.

FIG. 4 is a sequence diagram showing a method of transmitting data according to some embodiments. The process may be implemented in a network 300 such as that shown schematically in FIG. 3.

Prior to processing, communication devices A and B, data processing node A and B and the at least one other node 340 in the rest of the network 350 are powered up and the various couplings between them are established. At this stage, data processing nodes A and B are not aware of the location of communication devices A or B in the network 300. As such, if data processing node A or B were to receive network traffic for communication device A or B, they would broadcast the network traffic on all of their ports 331, 332, 332 and 361, 362, 363 (other than the one on which they received the network traffic) in line with standard DLF processing.

Processing begins at step 4a, when communication device A transmits data messages to the second port 332 of data processing node A via its second interface 312 as the backup interface. Data processing node A may respond to the data messages at step 4b. At step 4c, data processing node A creates a new entry in its forwarding database that associates communication device A with the second port 332, via which it received the data messages. The entry may associate the shared MAC address of communication device A with a Port ID of the second port 332. Communication device A continues to send the data messages intermittently (not shown) to enable data processing node A to select the second port 332 as the preferred forwarding port for communication device A in the event that data processing node A receives network traffic transmitted from the first interface 311 as the primary interface of communication device A at its first port 331.

Similarly to steps 4a to 4c, communication device B transmits data messages via its second interface 332 as the backup interface to data processing node B and receives appropriate response messages at steps 4d and 4e. At step 4f, data processing node B creates a new entry in its forwarding database to associate communication device B with its second port 362.

At step 4g, communication device A transmits data, for example in the form of a unicast message, for communication device B via its first interface 311 as the primary interface to the third port 363 of data processing node B. At step 4h, data processing node B checks its forwarding database and selects its second port 362 as the preferred forwarding port for communication device B. At step 4i, data processing node B transmits the unicast message to communication device B via its second port 362 as the preferred forwarding port, to the second interface 322 as the backup interface of communication device B. Appropriate acknowledgement messages are sent from communication device B to data processing node B and from data processing node B to communication device A at steps 4j and 4k respectively.

Thus, rather than transmitting the data using the relatively indirect path via the rest of the network 350, the data is transmitted via the relatively direct path between data processing node A and communication device B.

In some of the embodiments described above, one communication device transmits subsequent data destined for another communication device. A data processing node that receives the subsequent data transmits the subsequent data to the other communication device via a preferred forwarding port.

In other embodiments, various different types of data processing are described with reference to the network 300 shown in, and described in relation to, FIG. 3.

In some cases, the at least one node 340 in the rest of the network 350 may broadcast network traffic.

In some such cases, the at least one node 340 may explicitly broadcast the network traffic, for example by setting the destination address of the network traffic to be the broadcast address of the network 300. In such cases, data processing nodes A and B receive the network traffic via their first ports 331, 361 that are connected to the rest of the network 350, detect the broadcast address in the network traffic and transmit the network traffic via (at least) their second 332, 362 and third 333, 363 ports that are communicatively coupled, respectively, to the second interfaces 312, 322 of communication devices A and B and to the first interfaces 321, 311 of communication devices B and A. As such, communication device A and B receive the broadcast network traffic twice; communication device A receives the broadcast network traffic once from data processing node A via its second interface 312 as the backup interface and once from data processing node B via its first interface 311 as the primary interface and communication device B receives the broadcast network traffic once from data processing node B via its second interface 322 as the backup interface and once from data processing node A via its first interface 321 as the primary interface.

In other such cases, the at least one node 340 in the rest of the network 350 may transmit network traffic destined for one of communication device A or B which is received at a switch that does not have a record of the one of communication device A or B in its forwarding database. The switch then broadcasts a DLF unicast message addressed to the one of communication device A or B on all of its ports other than the one via which it received the network traffic destined for the one of communication device A or B. Both data processing nodes A and B may receive the DLF unicast message (since it was broadcast by the switch) and may consult their forwarding databases to determine whether they have a record for the one of communication device A or B. If, for example, the DLF unicast message were addressed to communication device A, then data processing node A would examine its forwarding database and identify that communication device A is associated with its second port 332, which is the preferred forwarding port for communication device A, because it has been receiving the periodic data messages from communication device A via its second port 332, even if it has also been receiving network traffic from communication device A via its first port 331. Data processing node A can then transmit the DLF unicast message to the second interface 312 as the backup interface of communication device A via its second port 332. Similarly, data processing node B examines its forwarding database and can identify that communication device A is associated with its third port 363, because it has been receiving network traffic from the first interface 311 as the primary interface of the communication device A via its third port 363. Data processing node B can then transmit the DLF unicast message to the first interface 311 as the primary interface of communication device A via its third port 363. As such, communication device A receives the DLF unicast message twice; once via each of its interfaces 311, 312.

In some cases, the at least one node 340 in the rest of the network 350 may transmit unicast data to one of communication device A or B, for example to communication device B. The unicast data is received via the first port 331 of the data processing node, in this case data processing node A, that is directly connected to the first interface 321 as the primary interface of communication device B since communication device B transmits network traffic from its first interface 321 as the primary interface via data processing node B. Data processing node B receives the DLF unicast data for communication device B and forwards the unicast data via its third port 333 to the first interface 321 as the primary interface of communication device B by virtue of an association between communication device B and the third port 333 in the forwarding database of data processing node A. In such cases, the coupling between the second interface 322 of communication device B and the second port 362 of data processing node B, need not be used for the transmission of the network traffic to communication device B.

In some cases, one of the communication devices A, B, for example communication device B, may broadcast subsequent data via its first interface 321 as the primary interface to the third port 333 of data processing node A via its first interface 321 as the primary interface. Data processing node A transmits the subsequent data on all of its ports 331, 332 other than its third port 333. As such, the subsequent data is sent into the rest of the network 350 via the first port 331 of data processing node A and also is sent directly to communication device A via the second port 332 of data processing node A. Data processing node A receives at least some of the broadcast subsequent data from the rest of the network 350 via its first port 361. Data processing node B forwards the broadcast data to communication device A device via its third port 363. As such, communication device A receives the subsequent data twice; once via its second port 312 as the backup port from data processing node A and once via its first interface 311 as the primary interface data processing node B. In such cases, the data processing node B received the broadcast data from the rest of the network 350 via its first port 361. However it also receives the periodic data messages from communication device B via its second port 362. The periodic data messages enable data processing node B to select its second port 362 as the preferred forwarding port communication device B in the event of receiving network traffic, in this case broadcast data, from communication device B via its first port 361.

In some cases, one of communication device A and B, for example communication device A, may wish to send unicast messages to a node in the rest of the network 350. In such case, communication device A transmits the unicast message via its first interface 311 as the primary interface. The unicast message is received via the third port 363 of data processing node B. Data processing node B consults its forwarding database for the address specified in the unicast message and, assuming that it locates an entry for that address, forwards the unicast message via its first port 361 towards the rest of the network 350 in which the other node is located.

In some cases, one of the communication devices A or B, for example communication device A, may send a probing request message to the other of the communication devices A or B, in this example to communication device B. Such probing request messages may be messages such as ARP or NDP messages that resolve higher-level addresses, such as IP addresses, into MAC addresses. Such probing messages are responded to via the same interface at which they are received. For example, communication device A may transmit an ARP request message that is destined for communication device B via its first interface 311 as the primary interface to the third port 363 of data processing node B. Data processing node B consults its forwarding database and selects its second port 362 as the preferred forwarding port for communication device B, by virtue of having received periodic data messages from communication device B via its second port 362. Data processing node B transmits the ARP request message from its second port 362 to the second interface 332 as the backup interface of communication device B. Communication device B responds to the ARP request message via its second interface 322 as the backup interface—rather than its first interface 321 which is selected as the primary port for transmitting network traffic to destinations in the network 300—to the second port 362 of data processing node B. Data processing node B receives the ARP response from communication device B and consults its forwarding database to determine the port via which the ARP response should be transmitted to communication device A. Data processing node B determines that the ARP response should be transmitted via its third port 363, for example because it received the ARP request message from communication device A via its third port 363, and then transmits the ARP response to the first interface 311 as the primary interface of communication device A via its third port 363.

In some cases, the coupling between the second port 332, 362 of data processing node A or B and the second interface 312, 322 as the backup interface of communication device A or B respectively may fail. Data processing nodes A and B may detect the failure of the coupling via the standard Ethernet protocol. Data processing node A or B can then remove the entry in its forwarding database for the MAC address associated with communication device A or B since it is no longer reachable via the second port 332, 362. If data processing node A or B receives traffic destined for the MAC address associated with communication device A or B that has been removed from its forwarding database, it broadcasts the traffic in accordance with the DLF procedure described above on all of its ports other than the one on which it received it. The traffic is, therefore, likely to go via the rest of the network 350 via the first port 331, 361.

In addition, data processing node A or B broadcasts DLF unicast messages for communication device A or B, whose MAC address has been removed from the forwarding database, until it receives data from the communication device A or B via its first port 331, 361 from the rest of the network 350. At this stage, it cannot receive data from communication device A or B via its second port 332, 362 since there is a failure associated with that port. Data processing node A or B then adds a forwarding database entry for the communication device A or B with the first port 331, 361 via which it received the broadcast data from the communication device A or B.

This is somewhat different from the case described previously where one of communication device A or B broadcasts network traffic via its first interface 321, 311 as the primary interface since, in the other case, the data processing node receiving the broadcast network traffic did not update its forwarding database in the event of receiving the network traffic via its first port 331, 361, because the second port 332, 362, via which it received data messages from communication device A or B, had a higher preference rank than the first port 331, 361.

In the current case, the data communication device has removed the entry associating communication device A or B with its second port 332, 362 because of the detected failure, so it is possible for the new entry associating communication device A or B with its first port 331, 361 to be added, even if the second port 332, 362 has a higher preference rank than the first port 331, 361. In the event that the coupling between the second interface 312, 322 as the backup interface of communication device A or B and the second port 332, 362 of the data processing node is re-established, communication device A or B can resume the periodic transmission of the data messages via its second interface 312, 332 as the backup interface to enable the data processing node to select the second port 332, 362 as the preferred forwarding port for communication device A or B. This processing is similar in the case of a failure of one of communication device A or B, as opposed to the failure of one of the couplings between communication device A or B and data processing node A or B respectively.

As explained above, in some cases, the coupling between the second port 332, 362 of data processing node A or B and the second interface 312, 322 as the backup interface of communication device A or B respectively may fail.

In some embodiments, communication device A and/or B includes management software that detects such a failure and performs recovery to try to minimise interruption to service in the network. For example, management software running on communication device A may detect a failure in the coupling between the second port 362 of data processing node B and the second interface 322 of communication device A. Instead of continuing to transmit network traffic via data processing node B, it may switch to using its second interface 312 as the primary interface for transmitting network traffic to destinations across the network. In such cases, network traffic destined for communication device B from communication device A can be transmitted from the second interface 312 of communication device A to the second port 332 of data processing node A and from the third port 333 of data processing node A to the first interface 321 of communication device B. In some cases, communication device A may initially send such network traffic via data processing node B until the management software determines that the second interface 312 should be selected as the primary interface, at which point it can switch over to using the second interface 312 as the primary of interface.

The above embodiments are to be understood as illustrative examples of the invention. Further embodiments of the invention are envisaged.

For example, in some embodiments described above, the subsequent data is transmitted via the most direct link to the communication device A or B, the most direct link being preferable to an indirect link to the communication device A or B. However, in other embodiments, the most direct link may not be the preferred link, for example if it is more expensive to use than the indirect link. In such cases, the second port 132, 332, 362 may be preferable to other ports 131, 133, 331, 333, 361, 363 for a reason other than its relatively direct link to the communication device and it can be assigned a relatively high preference rank on that basis.

In some embodiments described above, the second port 132, 332, 362 is assigned a relatively high preference rank prior to receiving the data messages. However, in other embodiments, the data processing node A or B may detect the data messages, determine the port via which they were received, and then infer that the port via which they were received should be assigned a relatively high preference rank. In such cases, the data messages indicate to the data processing node A or B that it should assign a relatively high preference rank to the port via which it receives the data messages.

In some embodiments described above, communication devices A and B are independent devices that both intermittently transmit data messages via their second interfaces 112, 132, 322 as the backup interfaces to data processing nodes A and B respectively and transmit network traffic via their first interfaces 111, 121, 311, 321 as the primary interfaces. However, in some embodiments, one of the communication devices A or B may be a primary communication device and the other communication device B or A may be a backup communication device to which communications can be failed over should a fault develop in relation to the primary communication device.

In such cases, the communication devices A or B may share a virtual MAC address which is assigned to the active communication device A or B at any given time. In the event that switchover to the non-active communication device B or A occurs, the non-active communication device B or A becomes the now-active communication device and is assigned the virtual MAC address. The now-active communication device starts to transmits network traffic from the virtual MAC address via its first interface 311, 321 as the primary interface and intermittently transmits data messages from the virtual MAC address via its second interface 312, 322 as the backup interface so that any switching hardware in the network 100, 300 can determine the new location of the now-active communication device that is currently associated with the virtual MAC address. Any data destined for that virtual MAC address can be forwarded correctly to the now-active communication device to which the virtual MAC address has been assigned.

In some embodiments, at least one of communication device A and communication device B comprises a redundant pair of devices. For example, communication device A may comprise a primary device and a backup device, both of which have respective first and second interfaces communicatively coupled to data processing node B and data processing node A respectively. In such cases, processing can be failed over from the primary device to the backup device of communication device A should the need arise. Failover from the primary device to the backup device in relation to communication device A may be independent of whether a primary device of communication device B is failed over to a backup communication device of device B.

As explained above, communication device A and B have a plurality of network communication interfaces. Although, in some embodiments, communication devices A and B comprise only two communication interfaces, one or both of communication devices A and B may comprise more than two communication interfaces. In such cases, the network may include correspondingly more data processing nodes.

In some of the embodiments described above, a communication device intermittently transmits data messages to a data processing node to enable the data processing node to select a preferred forwarding port for the communication device. However, in general, the communication device may transmit at least one data message to the data processing node to enable the data processing node to select a preferred forwarding port for the communication device. The data processing node may recognise that the at least one data message is for selecting the preferred forwarding port and may select the port via which it receives the at least one data messages as the preferred forwarding port for the communication device. The data processing node may include a control processer to which it forwards the at least one data message from the communication device. The control processer may then manage the data processing node so as to maintain the selection of the port via which the data processing node received the at least one data message as the preferred forwarding port for the communication device, even if the data processing node does not receive further data messages from the communication device. In some embodiments, the data processing node may monitor connectivity of the coupling between the second interface of the communication device and its second port and, in the event of a failure or other degradation in the coupling, may inform the control processor accordingly. The control processor may then deselect the second port as the preferred forwarding port for the communication device.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of transmitting data in a network, the network including a first communication device having a plurality of network communication interfaces, a second communication device having a network communication interface, and a data processing node having a plurality of network communication ports, the data processing node being arranged to select a forwarding port on which to forward data destined for a given communication device, the forwarding port being selected on the basis of a port on which the data processing node receives data from the given communication device, the data processing node being arranged to select a preferred forwarding port in the case of receipt of data from the given communication device on more than one of the plurality of ports, wherein:

the first communication device includes a first interface communicatively coupled to a first port of the data processing node and a second interface communicatively coupled to a second port of the data processing node; and the second communication device includes a third interface communicatively coupled to a third port of the data processing node, the method comprising:

comparing at least one connectivity condition associated with the coupling between the first interface and the first port of the data processing node and at least one connectivity condition associated with the coupling between the second interface and the second port of the data processing node;

selecting the first interface as a primary interface for the transmission of network traffic to destinations across the network on the basis of the comparison, and the second interface as a backup interface which is to be selected for the transmission of the network traffic in the case of a need to failover to the backup interface, wherein the coupling between the first interface and the first port of the data processing node provides a relatively direct communication path between the first communication device and the data processing node compared to the coupling between the second interface and the second port of the data processing node;

while the first interface is selected as the primary interface, transmitting network traffic from the first communication device via the first interface;

while the first interface is selected as the primary interface, transmitting at least one data message from the first communication device to the second port of the data processing node via the second interface, in order to enable the selection by the data processing node of the second port as the preferred forwarding port, for transmitting network traffic destined for the first communication device, in the event of the network traffic transmitted from the first communication device being received at the first port of the data processing node; and while the first interface is selected as the primary interface, receiving network traffic from the data processing node via the second interface, the network traffic having been received by the data processing node from the second communication device via the third port of the data processing node.

2. The method according to claim 1, further comprising while the first interface is selected as the primary interface, intermittently transmitting at least one data message from the first communication device via the second interface.

3. The method according to claim 1, further comprising setting a message destination identifier of the at least one data message to be the same as a message source identifier of the at least one data message, to allow the data processing node to recognise that the at least one data message is intended for processing only by the data processing node.

4. The method according to claim 1, further comprising setting a message destination identifier of the at least one data messages to be an identifier reserved for data messages that are for processing only by the data processing node, to allow the data processing node to recognise that the at least one data message is intended for processing only by the data processing node.

5. The method according to claim 1, wherein the data processing node is arranged to deselect the second port as the preferred forwarding port for the first communication device if no data is received from the first communication device via the second port for a period of time, and wherein the method further comprises intermittently transmitting data messages from the first communication device to the second port of the data processing node via the second interface at time intervals which are less than the period of time.

6. The method according to claim 1, wherein the first interface of the first communication device is indirectly coupled to the first port of the data processing node via at least one intermediate network node and wherein the second interface of the first communication device is directly coupled to the second port of the data processing node.

7. The method according to claim 1, wherein at least some of the at least one data messages comprise Address Resolution Protocol (ARP) messages, Neighbour Discovery Protocol (NDP) messages and/or Internet Control Message Protocol (ICMP) ping messages.

8. The method according to claim 1, wherein the first interface of the first communication device is indirectly coupled to the first port of the data processing node.

9. A method of forwarding data in a network, the network including a first communication device having a plurality of network communication interfaces, a second communication device having a network communication interface, and a data processing node having a plurality of network communication ports, the data processing node being arranged to select a forwarding port on which to forward data destined for a given communication device, the forwarding port being selected on the basis of a port on which the data processing node receives data from the given communication device, the data processing node being arranged to select a preferred forwarding port in the case of receipt of data from the given communication device on more than one of the plurality of ports, wherein the data processing node includes a first port communicatively coupled to a first interface of the first communication device, a second port communicatively coupled to a second interface of the first communication device and a third port communicatively coupled to a third interface of the second communication device, wherein the coupling between the first interface and the first port of the data processing node provides a relatively direct communication path between the first communication device and the data processing node compared to the coupling between the second interface and the second port of the data processing node, the method comprising:

receiving network traffic from the first communication device via the first port, wherein the network traffic is received based on a comparison made at the first communication device of at least one connectivity condition associated with the coupling between the first interface and the first port of the data processing node and at least one connectivity condition associated with the coupling between the second interface and the second port of the data processing node;

receiving at least one data message from the first communication device via the second port;

receiving network traffic destined for the first communication device from the second communication device via the third port; and while receiving the network traffic from the first communication device via the first port, maintaining selection of the second port as the preferred forwarding port for the network traffic destined for the communication device, on the basis of the at least one data message received via the second port, and transmitting the network traffic destined for the first communication device via the second port.

10. The method according to claim 9, further comprising intermittently receiving data messages from the first communication device via the second port.

11. The method according to claim 9, wherein the first port has a first preference rank and the second port has a second preference rank, and wherein the method further comprises determining that the second port should be selected as the preferred forwarding port on the basis of comparing the first and second preference ranks.

12. The method according to claim 9, wherein the data processing node is arranged to deselect the second port as the preferred forwarding port for the first communication device; if no data is received from the first communication device via the second port for a period of time.

13. The method according to claim 12, further comprising intermittently receiving data messages at time intervals which are less than the period of time.

14. The method according to claim 9, further comprising deselecting the second port as the preferred forwarding port for the first communication device in response to detecting the occurrence of a fault in relation to the coupling between the second port and the second interface of the first communication device.

15. The method according to claim 9, further comprising:
recognising that the at least one data message is intended for processing only by the data processing node; and
discarding the at least one data messages without forwarding to other network nodes following the selection of the second port as the preferred forwarding port.

16. The method according to claim 15, further comprising recognising that a message destination identifier in the at least one data message is the same as a message source identifier in the at least one data message.

17. The method according to claim 15, further comprising recognising that a message destination identifier in the at least one data message is reserved for data messages for processing only by the data processing node.

18. A first communication device for transmitting data in a network, the network including a second communication device having a network communication interface and the network including a data processing node having a plurality of network communication ports, the data processing node being arranged to select a forwarding port on which to forward data destined for a given communication device, the forwarding port being selected on the basis of a port on which the data processing node receives data from the given communication device, the data processing node being arranged to select a preferred forwarding port in the case of receipt of data from the given communication device on more than one of the plurality of ports, wherein the first communication device includes a first interface communicatively coupled to a first port of the data processing node and a second interface communicatively coupled to a second port of the data processing node, wherein the second communication device includes a third interface communicatively coupled to a third port of the data processing node, the first communication device comprising:

a memory; and a processor coupled to the memory, wherein the processor is configured:

to compare at least one connectivity condition associated with the coupling between the first interface and the first port of the data processing node and at least one connectivity condition associated with the coupling between the second interface and the second port of the data processing node;

to select the first interface as a primary interface for the transmission of network traffic to destinations across the network on the basis of the comparison, and the second interface as a backup interface which is to be selected for the transmission of the network traffic in the case of a need to failover to the backup interface, wherein the coupling between the first interface and the first port of the data processing node provides a relatively direct communication path between the first communication device and the data processing node compared to the coupling between the second interface and the second port of the data processing node;

while the first interface is selected as the primary interface, to transmit network traffic via the first interface;

while the first interface is selected as the primary interface, to transmit at least one data message to the second port of the data processing node via the second interface, in order to enable the selection by the data processing node of the second port as the preferred forwarding port, for transmitting network traffic destined for the first communication device, in the event of the network traffic transmitted from the first communication device being received at the first port of the data processing node; and while the first interface is selected as the primary interface, to receive network traffic from the data processing node via the second interface, the network traffic having been received by the data processing node from the second communication device via the third port of the data processing node.

19. A data processing node for forwarding data in a network, the network including a first communication device having a plurality of network communication interfaces and the network including a second communication device having a network communication interface, wherein the data processing node has a plurality of network communication ports, the data processing node being arranged to select a forwarding port on which to forward data destined for a given communication device, the forwarding port being selected on the basis of a port on which the data processing node receives data from the given communication device, the data processing node being arranged to select a preferred forwarding port in the case of receipt of data from the given communication device on more than one of the plurality of ports, and wherein the data processing node includes a first port which is configured to be communicatively coupled to a first interface of the first communication device, a second port which is configured to be communicatively coupled to a second interface of the first communication device and a third port which is configured to be communicatively coupled to a third interface of the second communication device, wherein the coupling between the first interface and the first port of the data processing node provides a relatively direct communication path between the first communication device and the data processing node compared to the coupling between the second interface and the second port of the data processing node, the data processing node comprising:

a memory; and a processor coupled to the memory, wherein the processor is configured:

to receive network traffic from the first communication device via the first port, wherein the network traffic is received based on a comparison made at the first communication device of at least one connectivity condition associated with the coupling between the first interface and the first port of the data processing node and at least one connectivity condition associated with the coupling between the second interface and the second port of the data processing node;

to receive at least one data message from the first communication device via the second port;

to receive network traffic destined for the first communication device from the second communication device via the third port; and to maintain selection of the second port as the preferred forwarding port for the network traffic destined for the first communication device, on the basis of the at least one data message received via the second port, and to transmit the network traffic destined for the first communication device via the second port.

20. A computer program product comprising a non-transitory computer-readable storage medium having computer readable instructions stored thereon, the computer readable instructions being executable by a computerized device to cause the computerized device to perform a method for transmitting data in a network, the network including a first communication device having a plurality of network communication interfaces, a second communication device having a network communication interface, and a data processing node having a plurality of network communication ports, the data processing node being arranged to select a forwarding port on which to forward data destined for a given communication device, the forwarding port being selected on the basis of a port on which the data processing node receives data from the given communication device, the data processing node being arranged to select a preferred forwarding port in the case of receipt of data from the given communication device on more than one of the plurality of ports, wherein:

the first communication device includes a first interface communicatively coupled to a first port of the data processing node and a second interface communicatively coupled to a second port of the data processing node; and the second communication device includes a third interface communicatively coupled to a third port of the data processing node, the method comprising:

comparing at least one connectivity condition associated with the coupling between the first interface and the first port of the data processing node and at least one connectivity condition associated with the coupling between the second interface and the second port of the data processing node;

selecting the first interface as a primary interface for the transmission of network traffic to destinations across the network on the basis of the comparison, and the second interface as a backup interface which is to be selected for the transmission of the network traffic in the case of a need to failover to the backup interface, wherein the coupling between the first interface and the first port of the data processing node provides a relatively direct communication path between the first communication device and the data processing node compared to the coupling between the second interface and the second port of the data processing node;

while the first interface is selected as the primary interface, transmitting network traffic from the first communication device via the first interface;

while the first interface is selected as the primary interface, transmitting at least one data message from the first communication device to the second port of the data processing node via the second interface, in order to enable the selection by the data processing node of the second port as the preferred forwarding port, for transmitting network traffic destined for the first communication device, in the event of the network traffic transmitted from the first communication device being received at the first port of the data processing node; and while the first interface is selected as the primary interface, receiving network traffic from the data processing node via the second interface, the network traffic having been received by the data processing node from the second communication device via the third port of the data processing node.

21. A computer program product comprising a non-transitory computer-readable storage medium having computer readable instructions stored thereon, the computer readable instructions being executable by a computerized device to cause the computerized device to perform method of forwarding data in a network, the network including a first communication device having a plurality of network communication interfaces, a second communication device having a network communication interface, and a data processing node having a plurality of network communication ports, the data processing node being arranged to select a forwarding port on which to forward data destined for a given communication device, the forwarding port being selected on the basis of a port on which the data processing node receives data from the given communication device, the data processing node being arranged to select a preferred forwarding port in the case of receipt of data from the given communication device on more than one of the plurality of ports, wherein the data processing node includes a first port communicatively coupled to a first interface of the first communication device, a second port communicatively coupled to a second interface of the first communication device and a third port communicatively coupled to a third interface of the second communication device, wherein the coupling between the first interface and the first port of the data processing node provides a relatively direct communication path between the first communication device and the data processing node compared to the coupling between the second interface and the second port of the data processing node, the method comprising:

receiving network traffic from the first communication device via the first port, wherein the network traffic is received based on a comparison made at the first communication device of at least one connectivity condition associated with the coupling between the first interface and the first port of the data processing node and at least one connectivity condition associated with the coupling between the second interface and the second port of the data processing node;

receiving at least one data message from the first communication device via the second port;

receiving network traffic destined for the first communication device from the second communication device via the third port; and while receiving the network traffic from the first communication device via the first port, maintaining selection of the second port as the preferred forwarding port for the network traffic destined for the first communication device, on the basis of the data messages received via the second port, and transmitting the network traffic destined for the first communication device via the second port.

* * * * *